United States Patent [19]

Kantner

[11] Patent Number: 4,737,410

[45] Date of Patent: Apr. 12, 1988

[54] POLYALKYLOXAZOLINE-REINFORCED ACRYLIC PRESSURE-SENSITIVE ADHESIVE COMPOSITION

[75] Inventor: Steven S. Kantner, Saint Paul, Minn.

[73] Assignee: Minnesota Mining and Manufacturing Company, St. Paul, Minn.

[21] Appl. No.: 936,820

[22] Filed: Nov. 28, 1986

[51] Int. Cl.[4] ............... B05D 3/04; B05D 3/12; C08L 79/04

[52] U.S. Cl. ............... 428/343; 428/352; 428/355; 428/356; 524/500; 524/516; 525/186

[58] Field of Search ............... 524/516, 500; 428/355, 428/356, 343, 914, 352, 145, 156; 525/186

[56] References Cited

U.S. PATENT DOCUMENTS

| | | | |
|---|---|---|---|
| Re. 24,906 | 12/1960 | Ulrich | 206/59 |
| Re. 31,887 | 5/1985 | Hodgson | 428/355 |
| 3,483,141 | 12/1969 | Litt et al. | 260/2 |
| 3,657,396 | 8/1972 | Kuramoto et al. | 260/901 |
| 3,740,366 | 6/1973 | Sanderson et al. | 524/398 |
| 4,033,918 | 7/1977 | Hauber | 524/296 |
| 4,337,325 | 6/1982 | Shah | 525/205 |
| 4,370,380 | 1/1983 | Shah | 428/355 |
| 4,413,080 | 11/1983 | Blake | 524/272 |
| 4,423,182 | 12/1983 | Bartman | 524/367 |
| 4,436,867 | 3/1984 | Pomplun | 524/503 |
| 4,474,928 | 10/1984 | Hoenig et al. | 525/186 |
| 4,500,683 | 2/1985 | Hori et al. | 524/533 |
| 4,522,967 | 6/1985 | Sheldon et al. | 524/377 |
| 4,528,044 | 7/1985 | Warchol | 524/602 |
| 4,532,187 | 7/1985 | Hoenig et al. | 428/457 |
| 4,547,530 | 10/1985 | McCreedy et al. | 525/186 |
| 4,554,324 | 11/1985 | Husman et al. | 525/301 |
| 4,562,225 | 12/1985 | Huber et al. | 524/275 |
| 4,582,877 | 4/1986 | Fairchok et al. | 525/186 |
| 4,623,688 | 11/1986 | Flanagan | 524/377 |
| 4,645,711 | 2/1987 | Winslow et al. | 428/355 |
| 4,656,077 | 4/1987 | Larimore et al. | 428/156 |
| 4,678,833 | 7/1987 | McCreedy et al. | 525/186 |

*Primary Examiner*—Herbert J. Lilling
*Attorney, Agent, or Firm*—Donald M. Sell; James A. Smith; Richard Francis

[57] ABSTRACT

Pressure-sensitive adhesives comprise blends of acrylate copolymer copositions with polyalkyloxazolines. The blends exhibit enhanced cohesive strength with balanced adhesive properties and are useful as coatings for sheet materials.

21 Claims, No Drawings

४,737,410

POLYALKYLOXAZOLINE-REINFORCED ACRYLIC PRESSURE-SENSITIVE ADHESIVE COMPOSITION

TECHNICAL FIELD

This application relates to normally tacky pressure sensitive adhesive compositions comprising a blend of an acrylic or methacrylic acid ester copolymer with reinforcing material and to sheet materials coated therewith.

BACKGROUND ART

Normally tacky pressure sensitive adhesive (PSA) compositions suitable for use in the manufacture of tapes and labels, for example, must possess a proper balance of the properties of adhesion, cohesion, stretchiness, and elasticity. Here, adhesion refers both to that property of immediate adhesion to a surface which is often termed "quick tack" or "quick stick" and to the "peel strength" or bond strength which develops when more complete surface contact is effected via the application of pressure. Cohesion refers to the property of "shear strength" or resistance of the applied PSA to failure when subjected to shearing forces. For PSA compositions derived from acrylic copolymers, it is not only possible to achieve this requisite four-fold balance of properties but also to benefit from the inherent, desirable characteristics of transparency and resistance to oxidation. Acrylic copolymeric PSAs also offer versatile processability and may be coated from solution (or emulsion) or via hot melt techniques.

While acrylic copolymeric PSA compositions (such as those described by Ulrich in U.S. Pat. No. Re. 24,906) have been found to be more than adequate for many adhesive applications and have therefore garnered tremendous continuing commercial success, there are many applications which require greater shear strength than can be provided by these relatively soft materials. For example, disposable diaper tapes, permanent labels, and packaging tapes must be able to adhere well and to retain their adhesive bond formation under exposure to high shear forces. PSAs for medical tape applications also require significant internal strength such that peeling does not result in cohesive failure, leaving residual adhesive on the skin. Attempts have been made to enhance the shear strength of acrylic PSAs, but the quick tack and peel values of the resultant compositions have generally diminished as the shear values have increased. This is due to the fact that the aforementioned balance of PSA properties is indeed a balance of interdependent properties, and it is extremely difficult to improve the internal or cohesive strength without also upsetting the other properties and destroying the overall pressure-sensitive nature of the adhesive system.

Thus, various ways of reinforcing, i.e., improving the shear strength, of acrylic copolymeric PSAs are known but each has its disadvantages. The molecular weight of the copolymer can be increased to improve internal strength, but this generally reduces tack and peel strength and produces a composition with poor processability. The polar monomer, e.g., acrylic acid, content of the copolymer can also be increased but, with such increase, there is generally a loss of adhesive tack or quick stick, as well as peel strength, due to the decreased compliance of the PSA. Crosslinking may also be utilized to enhance the cohesive strength of an acrylic PSA composition, but it often requires expensive equipment and/or additional process steps. Chemical crosslinking often causes a shortening of pot life. The crosslinked adhesive composition may also exhibit loss of tack and peel strength as well as reduced processability. Moreover, difficulties in achieving reproducible levels of crosslinking are common, and some systems may involve crosslinking reactions which continue for long periods of time after manufacture, resulting in noticeable changes in PSA properties with time. There has thus been long-standing interest in finding a simple method for improving the cohesive strength of an acrylic copolymeric PSA without crosslinking.

U.S. Pat. No. 4,554,324 discloses that crosslinking may be avoided via the grafting of acrylic copolymers with reinforcing, thermoplastic polymeric moieties, e.g., polystyrene, to obtain enhanced shear strength without sacrificing processability. However, this grafting method is not a simple means of reinforcement of commercially available acrylic PSAs because it requires sophisticated process steps in order to effect the chemical modification of the acrylic copolymer. While a simple blending of acrylic adhesive and reinforcing material may produce a reinforced adhesive composition, that is not always the case. U.S. Pat. No. 4,500,683 teaches that no marked improvement in cohesive strength is achieved via mere blending of an acrylic PSA with a high Tg (greater than 273° K.) homopolymer (or copolymer) derived from ethylenically unsaturated monomer(s) such as styrene or vinyl acetate. This patent further states that such blending produces a significant, undesirable drop in adhesive strength and that the desired reinforcement with retention of balanced PSA properties can be achieved only by homo- or copolymerizing one or more ethylenically unsaturated monomers in the presence of the acrylic polymer to form a composition containing an addition-polymerization polymer.

Blending processes have been utilized successfully for the select purpose of reinforcement of acrylic copolymers of low molecular weight. U.S. Pat. Nos. 4,337,325, 4,370,380, and 4,423,182 describe hot melt coatable acrylic PSA compositions exhibiting enhanced shear strength and good adhesive properties (i.e., good tack and peel). The first two patents teach the use of vinyl lactam polymers or copolymers as blended reinforcing agents, and the third patent describes ionomeric PSAs which are reinforced via the addition of at least one miscible metal salt of an o-methoxy aryl acid. In each case, it was possible to achieve a balance of adhesive and cohesive PSA properties through the use of low molecular weight (hot melt coatable) acrylic copolymers which, by virtue of their molecular weight, possess very good tack and adhesive properties but are of insufficient cohesive strength to be useful alone as PSAs. Such tacky "non-PSA" materials can tolerate the substantial losses in tack and adhesive or peel strength which, as noted above, generally accompany an increase in the cohesive or shear strength of a PSA composition. However, acrylic copolymers of sufficient molecular weight, and, thereby, cohesive strength, to function alone as PSAs are inherently less tacky and much more limited in their ability to tolerate such losses.

Transparent, water-soluble PSA compositions are described in U.S. Pat. No. 3,657,396 which, again, teaches that reinforcement of highly tacky polymers can be achieved via blending. Rather than dealing with acrylic polymers, however, this patent concerns poly(vinylmethyl ether)-based formulations which are blended with cellulosic polymers, water-soluble phenolic resins, water-soluble polyvinyl compounds such as poly(vinyl alcohol) or poly(vinyl pyrrolidone), water-soluble acrylic homopolymers or copolymers, vinyl methyl ether-maleic anhydride copolymers, or carboxylic-modified poly(vinyl acetate).

Polymers of 2-oxazolines are known and, often in the form of blends with compatible polymers, have proven utilities as hot melt and/or water dispersible adhesives and as adhesion enhancers. For example, U.S. Pat. Nos. 4,436,867 and 4,522,967 teach the use of polyethyloxazoline in water dispersible, non-pressure sensitive adhesive compositions. The former patent describes creping adhesives consisting of an aqueous mixture of polyethyloxazoline and a thermoplastic polymer such as poly(vinyl alcohol), poly(vinyl pyrrolidone), or ethylene-vinyl acetate copolymer. The latter patent discloses a water dispersible, heat activatable adhesive composed of polyethyloxazoline, a water dispersible plasticizer (such as an ethylene-vinyl acetate copolymer, a water dispersible acrylic polymer, or a water dispersible vinyl acetate-acrylic copolymer), and an anti-blocking agent such as polyethylene glycol or polypropylene glycol. U.S. Pat. Nos. 4,474,928 and 4,532,187 are also adhesive-related and concern the addition of poly-2-oxazoline to a polyolefin or an ethylene-carboxylic acid copolymer, etc., to enhance adhesion to a substrate. It is noted that the blend can be used as a hot melt or solvent-based (non-pressure sensitive) adhesive. Oxazoline polymers have also been utilized as viscosity modifiers, components of semipermeable membranes, etc. However, the use of poly-2-oxazolines in pressure sensitive adhesive compositions has, to our knowledge, not been described.

SUMMARY OF THE INVENTION

This invention provides cohesively-reinforced, normally tacky acrylic copolymeric PSA compositions comprising a blend of acrylic or methacrylic acid ester copolymer with polyalkyloxazoline. It has been found that polyalkyloxazolines are miscible with polar monomer-containing acrylate (or methacrylate) copolymers and that optically clear blends can be obtained. It has further been discovered that acrylic (or methacrylic) PSA compositions derived from such blends exhibit enhanced cohesive strength without significant losses in peel strength or tack. Thus, this invention makes possible the reinforcement of acrylic (or methacrylic) copolymers of sufficient molecular weight to function alone as PSAs, as tolerance of only minor losses in tack and peel is required. The simple blending process obviates the need for crosslinking with its accompanying problems and is readily adaptable for reinforcement of commercially available polar monomer-containing acrylic copolymeric PSAs, since no expensive equipment or complex process steps are necessary. Improvement in cohesive strength is reproducibly obtained, and the resultant blends are well-suited for use in demanding PSA applications, e.g., disposable diaper tapes, permanent labels, packaging tapes, etc., for which greater shear strength is required than can be provided by conventional acrylic copolymeric PSAs. The adhesive blends of the present invention are also useful as improved cohesive strength PSAs for use on skin, where removal of the PSA without leaving a residue is important. Here and throughout, the designation acrylic (or methacrylic) [acrylate(or methacrylate)] copolymer is meant to encompass acrylates, methacrylates, copolymers of acrylate and methacrylate monomers, and copolymers of either or both with other vinyl monomer(s), as will be detailed below.

A PSA composition of this invention comprises a blend of a polyalkyloxazoline with an acrylic (or methacrylic) acid ester copolymer composition comprising a polar monomer-containing acrylate (or methacrylate) copolymer which is inherently tacky at the use temperature or which can be tackified, as known in the art, via the addition of a compatible tackifying resin and/or plasticizer. For a given acrylate/oxazoline system, the degree of reinforcement imparted to the acrylic composition by addition of the polyalkyloxazoline is dependent upon the molecular weight of the oxazoline polymer and its weight percentage in the blend, as well as upon the molecular weight of the acrylic copolymer and its polar monomer content. These parameters can be varied so as to achieve optimum cohesive and adhesive properties for a particular application, and the molecular weights and weight percentages are generally chosen so as to provide an increase in shear strength of at least about 50%, preferably at least about 100%, most preferably at least about 300%. The amount of polyalkyloxazoline should not render the composition non-tacky. Of course, the degree of tack for a particular adhesive composition may vary from slightly tacky to very tacky, depending upon the particular application. Preferably, the accompanying decrease in peel strength is no more than about 70% (relative to control compositions containing no polyalkyloxazoline).

More specifically, a PSA composition of this invention comprises a blend of the following components:
a. an acrylate (or methacrylate) copolymer having an inherent viscosity greater than about 0.2 comprising copolymerized A and s monomers wherein:
   A is at least one free radically polymerizable vinyl monomer, at least one of which is an acrylic or methacrylic acid ester of a non-tertiary alcohol having from 1 to 18 carbon atoms with the average number of carbon atoms being about 4–12; and
   B is at least one polar monomer copolymerizable with A, the amount by weight of B monomer being up to about 30% of the total weight of all monomers in the copolymer.
b. up to about 150 parts by weight of a compatible tackifying resin per 100 parts by weight copolymer;
c. up to about 50 parts by weight of a compatible plasticizer per 100 parts by weight copolymer; and
d. sufficient polyalkyloxazoline of molecular weight above about 1,000, to provide the resultant blend with an increased shear strength.

In addition to the above-described PSA composition, this invention also provides coated sheet material comprising a backing member and a PSA coating (comprising the PSA composition of this invention) covering at least a portion of at least one major surface thereof. Specific products comprising the coated sheet material, namely, a roll of tape and a transfer tape, are provided as well. The roll of tape comprises a flexible backing sheet having at least one major surface coated with the PSA of this invention, and the transfer tape comprises a film of the PSA composition on at least one release liner.

DETAILED DESCRIPTION OF THE INVENTION

The A monomer or monomers of the above-defined acrylate (or methacrylate) copolymer are chosen such that a tacky or tackifiable material is obtained upon polymerization of A and B. Representative examples of A monomers (which may be used alone and/or in combination) are vinyl monomers including the acrylic or methacrylic acid esters of non-tertiary alcohols such as methanol, ethanol, 1-propanol, 2-propanol, 1-butanol, 2-methyl-1-propanol, 1-pentanol, 2-pentanol, 3-pentanol, 2-methyl-1-butanol, 3-methyl-1-butanol, 2-hexanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, 1-hexadecanol, 1-octadecanol, and the like. Such monomers are known in the art, and many are commercially available. Preferred polymerized A monomer compositions include poly(butyl acrylate), poly(isooctyl acrylate), poly(isononyl acrylate), poly(isodecyl acrylate), poly(2-ethylhexyl acrylate), and copolymers of butyl acrylate, isooctyl acrylate, isononyl acrylate, isodecyl acrylate, or 2-ethylhexyl acrylate with other A monomer or monomers.

The polar monomers, B, suitable for use in accordance with this invention are those having hydroxyl or carboxylic, sulfonic, or phosphonic acid functionality. Representative examples are 2-hydroxyethylacrylate, 2-hydroxyethylmethacrylate, hydroxypropylacrylate, acrylic acid, methacrylic acid, itaconic acid, maleic acid, fumaric acid, vinyl benzoic acid, 2-carboxyethylacrylate, 2-sulfoethylmethacrylate, and 4-vinyl phenyl phosphonic acid. Preferred B monomers are acrylic acid, 2-carboxyethylacrylate, itaconic acid, 2-hydroxyethylacrylate, hydroxypropylacrylate, and 2-sulfoethylmethacrylate. The amount by weight of B monomer preferably does not exceed about 30% of the total weight of all monomers, such that excessive PSA firmness is avoided. Incorporation of B monomer to the extent of about 1% to about 15% by weight is most preferred and provides for compatible blends possessing good cohesive and adhesive properties.

The acrylic or methacrylic copolymer may include other A monomers besides the above-described A and B monomers in quantities which do not render the composition non-tacky to improve performance, reduce cost, or for other purposes. Examples of such other A monomers include vinyl esters, vinyl chloride, vinylidene chloride, styrene, N-vinyl pyrrolidone, macromolecular monomers such as monoacrylic functional polystyrene and polydimethylsiloxane, and the like.

Especially preferred acrylic or methacrylic copolymers for medical use are the so called "Moist Skin Adhesives" disclosed in International application No. PCT/US84/00506. These adhesives preferably include a hydrophilic macromolecular A monomer containing, e.g., poly(ethylene oxide) or poly(propylene oxide), along with the other A and B monomers.

The copolymerization of the A and B monomers is by conventional free radical polymerization such as described by Ulrich, U.S. Pat. No. Re. 24,906. The monomers are dissolved in an inert organic solvent and polymerized utilizing a suitable free radical initiator which can be either thermally or photochemically activated. Suitable thermally activated initiators include azo compounds such as 2,2'-azobis(isobutyronitrile), hydroperoxides such as tert-butyl hydroperoxide, and peroxides such as benzoyl peroxide or cyclohexanone peroxide. Suitable photochemically activated initiators include benzophenone, benzoin ethyl ether, and 2,2-dimethoxy-2-phenyl acetophenone. The amount of initiator used is generally about 0.01% to about 5% by weight of the total polymerizable composition.

The organic solvent used in the free radical copolymerization can be any organic liquid which is inert to the reactants and product and which will not otherwise adversely affect the reaction. Suitable solvents include ethyl acetate and mixtures such as ethyl acetate or heptane with toluene or isopropyl alcohol. Other solvent systems are useful. The amount of solvent is generally about 30–80% by weight of the total weight of reactants and solvent. In addition to solution polymerization, the copolymerization can be carried out by other well-known techniques such as suspension, emulsion, or bulk polymerization.

Copolymerization of the A and B monomers is effected so as to provide acrylate (or methacrylate) copolymer having an inherent viscosity greater than about 0.2, preferably from about 0.4 to about 2.5. For copolymers of inherent viscosity below about 0.2, less than optimum enhancement of cohesive strength is obtained at the levels of polyalkyloxazoline (and polar monomer) consistent with this invention, and higher levels result in poor adhesive properties. Copolymers of inherent viscosity greater than about 2.5 may possess acceptable cohesive strength without addition of a reinforcing agent, although, as mentioned previously, adhesive properties and processability diminish as molecular weight and inherent viscosity increase.

Following copolymerization, the resultant acrylate or methacrylate copolymer may, when necessary or desirable, be blended with a compatible tackifying resin and/or plasticizer in order to optimize the ultimate tack and peel properties of the PSA composition. The use of such tack-modifiers is common in the art, as is described in the *Handbook of Pressure-Sensitive Adhesive Technology* edited by Donatas Satas (1982). Examples of useful tackifying resins include rosin, rosin derivatives, polyterpene resins, phenolic resins, coumarone-indene resins, and the like. Plasticizers which can be employed include the well-known extender oils (aromatic, paraffinic, or naphthenic), as well as a wide variety of liquid polymers. When used, tackifying resin is preferably added in an amount not to exceed about 150 parts by weight per 100 parts by weight copolymer, and plasticizer may be added in an amount up to about 50 parts by weight per 100 parts by weight copolymer.

It is also within the scope of this invention to include various other components in the adhesive formulation. For example, it may be desirable to include such materials as pigments, fillers, stabilizers, or various polymeric additives.

The polyalkyloxazolines suitable for blending with the above-described acrylate or methacrylate copolymers to form the PSA compositions of this invention are polymers having pendant N-acyl groups, as shown by the following structure:

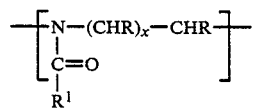

These polymers are readily prepared by the ring-opening polymerization of 2-oxazolines or like compounds having a structure as follows:

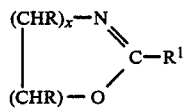

Both homopolymers and copolymers of two or more monomers are useful. R is hydrogen or an inertly-substituted lower alkyl (i.e., one to three carbon atoms) group, x is 1 or 2, and $R^1$ refers to the substituent heretofore designated "alkyl", which typically is selected from hydrogen, phenyl, or alkyl having up to about 20 carbon atoms (or inertly-substituted derivatives thereof). Thus, $R^1$ may be hydrogen, alkyl, halogenated alkyl, aryl, halogenated aryl, aralkyl, alkylaryl, saturated alicyclic, or alkenyl, as detailed in U.S. Pat. No. 3,483,141 which describes a process for the preparation of such polymers. The terminology "inertly-substituted" means that the moiety contains no substituent group which interferes with the polymerization of the monomer or with the ability of the resultant polyoxazoline to form a miscible blend with the acrylate or methacrylate copolymer. Illustrative inert substituents include halogen, alkenyl, alkyl, alkoxy, etc. Further, since x may be either 1 or 2, the term polyalkyloxazoline is technically meant to encompass both poly-2-oxazolines and poly-2-oxazines.

The ring-opening polymerization of 2-oxazoline monomers is generally conducted in the presence of a cationic polymerization catalyst at a reaction temperature of about 0°-200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates, and other like catalysts. This polymerization is further described in *Ring-Opening Polymerization*, Volume 2, edited by K. J. Ivin and T. Saegusa (1984).

In preparing the PSA compositions of this invention, polyalkyloxazolines of molecular weight within a range from about 1,000 to about 2,000,000 are utilized. Polymers of molecular weight below 1,000 provide only weak reinforcement, and those above 2,000,000 produce PSAs which exhibit too large a drop in peel adhesion and which are not readily adaptable to hot melt coating. Molecular weights of from about 2,000 to about 500,000 are preferred, with from about 5,000 to about 50,000 being most preferred. Also, preferred are oxazoline polymers where x is 1, R is hydrogen, and $R^1$ from hydrogen and alkyl groups containing up to about 10 carbon atoms, with the most preferred R substituents being hydrogen, methyl, ethyl, and propyl.

The blends of the present invention are typically optically clear or slightly hazy in appearance, indicating homogeneity to the extent that no discrete particles of either component greater than about 4000 Å in diameter are present. The blends may be prepared "post-polymerization" by mixing solutions or dispersions of the polyalkyloxazoline and the acrylate copolymer composition (which may contain tackifier and/or plasticizer) in any desired vehicles or solvents which are miscible. Melt blending is useful, as well. Blending may also be carried out "pre-polymerization" by dissolving the polyalkyloxazoline in the monomer/initiator/diluent mixture. As stated previously, the polyalkyloxazoline is added in an amount so as to provide the blend with an appropriate increase in shear strength. Such reinforcement with retention of adhesive properties is typically achieved via addition of from about 0.2% to about 25% by weight of oxazoline polymer, based upon the combined weights of the acrylate copolymer and the polyoxazoline. A range of from about 0.5% to about 10% by weight is preferred and, at the molecular weights detailed above, provides enhanced cohesive strength and optimally balanced adhesive properties for the acrylate copolymers of this invention which have been previously described as containing up to about 30% by weight of polar comonomer(s).

The PSA compositions of this invention are easily coated upon suitable flexible or inflexible backing materials by conventional coating techniques to produce PSA-coated sheet materials. The flexible backing may be of any material which is conventionally utilized as a tape backing or may be of any other flexible material. Representative examples of flexible tape backing materials include paper, plastic films such as poly(propylene), poly(ethylene), poly(vinyl chloride), polyester [e.g., poly(ethylene terephthalate)], cellulose acetate, and ethyl cellulose. Backings may also be of woven fabric formed of threads of synthetic or natural materials such as cotton, nylon, rayon, glass, or ceramic material, or they may be of a nonwoven fabric such as airlaid webs of natural or synthetic fibers or blends of these. In addition, the backing may be formed of metal, metallized polymeric film, or ceramic sheet material. The PSA-coated sheet materials may take the form of any article conventionally known to be utilized with PSA compositions such as labels, tapes, signs, covers, marking indices, and the like. In the medical field, the sheet materials may take the form of dressings, surgical drapes, closure strips, etc.

The PSA compositions of this invention may be coated by any of a variety of conventional coating techniques such as roll coating, knife coating, or curtain coating. The PSA compositions may also be coated without modification by extrusion, coextrusion, or hot melt techniques by employing suitable conventional coating devices for this purpose. Primers may be used, but they are not always necessary. The resultant coatings do not require curing or crosslinking. However, if enhancement of resistance to solvents, etc., is desired, crosslinking may be effected by standard methods well-known in the art, such as radiation curing (electron beam or ultraviolet light) or chemical crosslinking.

EXAMPLES

The invention is further illustrated by the following examples, in which all parts are by weight unless otherwise stated.

EXAMPLES 1–101

Copolymers of alkyl acrylates with polar monomers were prepared using conventional solution polymerization techniques. In a typical example 190 g of isooctylacrylate, 10 g of acrylic acid, and 0.5 g of 2,2'-azo-bis-(isobutyronitrile) available under the trade designation "Vazo" 64 were dissolved in 300 g of ethyl acetate in a 1 L bottle, the headspace purged with nitrogen, and the bottle sealed and placed in a rotating constant temperature bath for 16 hrs. at 55° C. The resulting copolymer was obtained in >98% conversion having an inherent viscosity (IV) of 1.25 dl/g. Inherent viscosity was measured by conventional means using a Cannon-Fenske #50 viscometer in a water bath controlled at 25° C. to measure the flow time of 10 ml of a polymer solution (0.2 g of polymer per deciliter in ethyl acetate). Other solution copolymers were prepared similarly, some with chain transfer agent (0.02 to 0.20% carbon tetrabromide) to obtain lower IV copolymers. The solution copolymers and their IVs are listed in Table I.

TABLE I

Solution Polymers of Alkyl Acrylates

| No. | Polymer | IV (dl/g) |
|---|---|---|
| 1 | 97/3 IOA/AA | 0.51 |
| 2 | 97/3 IOA/AA | 1.16 |
| 3 | 96/4 IOA/AA | — |
| 4 | 95/5 IOA/AA | 0.56 |
| 5 | 95/5 IOA/AA | 0.70 |
| 6 | 95/5 IOA/AA | 1.19 |
| 7 | 95/5 IOA/AA | 1.25 |
| 8 | 94/6 IOA/AA | 1.24 |
| 9 | 93/7 IOA/AA | 0.59 |
| 10 | 93/7 IOA/AA | 1.25 |
| 11 | 90/10 IOA/AA | 0.67 |
| 12 | 70/25/5 IOA/MA/AA | — |
| 13 | 75/20/5 IOA/MA/AA | — |
| 14 | 92.5/5/2.5 IOA/HEA/AA | — |
| 15 | 91.5/5/3.5 IOA/HEA/AA | — |
| 16 | 89/7.5/3.5 IOA/HEA/AA | — |
| 17 | 89.5/7/3.5 IOA/NVP/AA | — |
| 18 | 86.5/10/3.5 IOA/NVP/AA | — |
| 19 | 84.5/12/3.5 IOA/NVP/AA | — |
| 20 | 97/3 n-BA/AA | — |
| 21 | 95/5 n-BA/AA | — |
| 22 | 98/2 IOA/ITA | — |
| 23 | 96/4 IOA/ITA | — |
| 24 | 98/2 IOA/SEMA | — |
| 25 | 95.5/4.5 IOA/SEMA | — |
| 26 | 85/15 IOA/HEA | — |
| 27 | 90/10 IOA/CEA | — |
| 28 | 80/20 IOA/CEA | — |
| 29 | 70/20/10 IOA/CEA/HPA | — |
| 30 | 70/15/15 IOA/CEA/HPA | — |
| 31 | 70/15/15 IOA/EOA-16/AA | 0.84 |
| 32 | 70/20/10 IOA/EOA-16/AA | 0.80 |
| 33 | 80/15/5 IOA/EOA-16/AA | 0.96 |
| 34 | 90/5/5 IOA/HEA/AA | 0.46 |

IOA = isooctyl acrylate
n-BA = n-butyl acrylate
AA = acrylic acid
ITA = itaconic acid
HEA = 2-hydroxyethylacrylate
SEMA = 2-sulfoethylmethacrylate
MA = methyl acrylate
CEA = 2-carboxyethylacrylate
NVP = N—vinyl-2-pyrrolidone
HPA = hydroxypropylacrylate
EOA-16 = ethylene oxide acrylate[1]
[1]Prepared from Carbowax ™ 750 (a methoxy poly(ethylene oxide) ethanol of approximately 750 molecular weight, available from Union Carbide Corp.) according to the procedure described in International Application No. PCT/US84/00506

Poly(ethyloxazoline) of two different molecular weights (50,000 and 500,000) was obtained from The Dow Chemical Company, under the trade designations PEOX50 and PEOX500 respectively. In addition, homopolymers and copolymers of alkyloxazolines were prepared by reacting alkyloxazoline monomer with methyl tosylate initiator in acetonitrile at 80° C. as described in U.S. Pat. No. 3,483,141. The alkyloxazoline monomers were obtained from commercial sources or prepared in accordance with known procedures by cyclodehydration with sulfuric acid of the N-(2-hydroxyethyl)amides which in turn came from reaction of the methyl ester with ethanolamine in the presence of sodium methoxide catalyst. The poly(alkyloxazolines) and their molecular weights are listed in Table II.

TABLE II

| | Poly(alkyloxazolines) | |
|---|---|---|
| No. | Alkyl Group | MW × 10⁻³ |
| 1 | methyl | 5 |
| 2 | 2/1 methyl/ethyl copolymer | 5 |
| 3 | ethyl | 5 |
| 4 | ethyl | 50 |
| 5 | ethyl | 500 |
| 6 | butyl | 5 |
| 7 | 3-heptyl | 5 |
| 8 | p(t-butylphenyl) | 5 |

Blends of the alkylacrylate copolymers with varying weight percents of the poly(alkyloxazolines) were prepared as enumerated in Table III. Typically, a solution of the poly(alkyloxazoline) in isopropanol was added to an ethylacetate solution of the alkyl acrylate copolymer. The blend was diluted as needed with additional solvent to obtain a coatable viscosity, and the resulting homogeneous solution knife-coated onto 37 micrometer thick polyester film to a dry adhesive thickness of 25 micrometers. After drying (65° C. for 10 min.) and conditioning 24 hrs. at 23° C. and 50% relative humidity, the adhesive properties of the tape were determined.

Test Methods

The test methods used to evaluate the PSA-coated flexible sheet materials of the examples are industry standard tests. The standard tests are described in various publications of the American Society for Testing and Materials (ASTM), Philadelphia, Pennsylvania, and the Pressure Sensitive Tape Council (PSTC), Glenview, Ill., and are detailed below. The reference source of each of the standard test methods is also given.

Shear Strength

Reference: ASTM: D3654-78; PSTC-7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive-coated strips applied to a stainless steel panel such that a 12.7 mm by 12.7 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces, thus insuring that only the shear forces are measured, in an attempt to more accurately determine the holding power of the tape being tested. The time elapsed for each tape example to separate from the test panel is recorded as the shear strength. Unless otherwise noted, all shear failures reported herein are cohesive failures of the adhesive.

Peel Adhesion

Reference: ASTM D3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A 12.7 mm width of the coated sheet is applied to the horizontal surface of a clean glass test plate with at least 12.7 lineal cm in firm contact. A 2 kg hard rubber roller is used to apply the strip.
2. The free end of the coated strip is doubled back nearly touching itself so the angle of removal will be 180°. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the average of the range of numbers observed during the test.

Tack

The tack of these adhesives was qualitatively assessed by a "finger appeal" test and assigned a value of 1 through 5 where 1=tack free, 2=poor tack, 3=medium tack, 4=good tack, and 5=excellent tack. On this scale "Scotch" "Magic" transparent tape (Trademark of Minnesota Mining and Manufacturing Co.) has a rating of 5.

Skin Adhesion

Adhesion to skin was determined on human volunteers. The adhesive-coated sheet material to be tested is cut into 1×3 inch (2.5×7.6 cm) strips which are applied to the (dry) backs of each of 6 individuals (i.e., 3 men and 3 women, randomly selected) who are lying on procedure tables in prone positions with arms at the sides and heads turned to one side. For each individual, three strips of the sheet material are applied to one or the other side of the spinal column and positioned such that the length of each strip is at a right angle to the spinal column. The strips are applied without tension or pulling of the skin and there is at least a ⅛ to ⅜ inch space between each strip. After all strips are in place, a 4.5 pound rubber roller according to the specifications found in the 7th Edition of the Pressure-Sensitive Tape Council Brochure (1976), is rolled along the length of each strip, once in each direction, at a travel speed of about 3 inches per second, to assure even pressure application to each strip. When rolling the strip, no manual pressure is applied to the roller.

To determine the adhesive value, each strip is removed using a conventional adhesion tester having a 25# test line and a 1-inch clip attached to the test line. The clip is attached to the edge of the strip which is farthest from the spinal cord, the clip being attached by manually lifting about ¼-inch of that edge of the strip and attaching the clip thereto. This orientation permits the strip to be removed towards the spine so that pull is with the direction of fine hair growth on the back. This is facilitated by positioning the adhesion tester opposite the side of the individual's back from which the strip is to be removed. The adhesion tester is aligned with, and is at the same height as, the strip to be removed. An example of a suitable adhesion tester for use in this test comprises a conventional motor driven screw with moving carriage and a transducer. Connected to the transducer is a load cell accessory. Removal force placed on the transducer results in a signal change which is passed through a readout meter to a strip chart recorder.

The strip is pulled over itself in a plane parallel (180°) to the back and the rate of removal is 6 inches (15.2 cm) per minute. To determine initial skin adhesion, the strip is removed within about 5 minutes of its application to the back. Adhesion after 48 hours is also determined by removal of the strip in a similar manner.

Residue

When the skin adhesion test described above is performed, the skin underlying the tape sample is visually inspected to determine the amount of adhesive residue left on the surface of the skin. Each sample is assigned a numerical rating from 0 to 5 based on the following scale.

| Rating | Definition |
|---|---|
| 0 | No visible residue |
| 1 | Only residue at edges of tape |
| 2 | Residue covering 1% to 25% of tested area |
| 3 | Residue covering 25% to 50% of tested area |
| 4 | Residue covering 50% to 75% of tested area |
| 5 | Residue covering 75% to 100% of tested area. |

The results of all tape samples of a given panel were averaged and are reported below. Due to the subjectivity of the visual inspection for residue, no degree of precision can be inferred from the numbers to the right of the decimal point and those numbers should be treated as only rough approximations.

The adhesive properties for the starting alkyl acrylate copolymers and their blends with poly(alkyloxazolines) are shown in Table III. These examples contrast the enhanced shear strengths obtained for the blends of this invention with the shear values obtained for the control compositions containing no poly(alkyloxazoline).

TABLE III

Tape Properties of Blends

| Example | Acrylate | Oxazoline | Wt. % | Tack | Shear (Min.) | Peel (N/100 mm) |
|---|---|---|---|---|---|---|
| 1* | 1 | — | 0 | 5 | 0.2 | 96 |
| 2 | 1 | 4 | 5 | 5 | 0.4 | 83 |
| 3 | 1 | 4 | 10 | 5 | 0.6 | 83 |
| 4* | 2 | — | 0 | 5 | 1.5 | 72 |
| 5 | 2 | 4 | 5 | 5 | 4.3 | 68 |
| 6 | 2 | 4 | 10 | 5 | 5.9 | 70 |
| 7* | 3 | — | 0 | 5 | 2 | 88 |
| 8 | 3 | 4 | 5 | 5 | 37 | 85 |
| 9 | 3 | 4 | 10 | 4 | 42 | 81 |
| 10* | 4 | — | 0 | 5 | 0.7 | 88 |
| 11 | 4 | 4 | 1 | 5 | 4 | 63 |
| 12 | 4 | 4 | 5 | 5 | 28 | 63 |
| 13 | 4 | 4 | 10 | 4 | 57 | 59 |
| 14* | 5 | — | 0 | 5 | 4 | 94 |
| 15 | 5 | 4 | 5 | 4 | 74 | 57 |
| 16 | 5 | 4 | 10 | 4 | 115 | 55 |
| 17* | 6 | — | 0 | 5 | 6 | 83 |
| 18 | 6 | 4 | 1 | 5 | 22 | 77 |
| 19 | 6 | 4 | 5 | 4 | 176 | 66 |
| 20 | 6 | 4 | 10 | 3 | 327 | 55 |
| 21 | 6 | 3 | 1 | 5 | 17 | 70 |
| 22 | 6 | 3 | 5 | 5 | 83 | 72 |
| 23 | 6 | 3 | 10 | 4 | 130 | 53 |

TABLE III-continued
Tape Properties of Blends

| Example | Acrylate | Oxazoline | Wt. % | Tack | Shear (Min.) | Peel (N/100 mm) |
|---|---|---|---|---|---|---|
| 24 | 6 | 5 | 1 | 5 | 29 | 59 |
| 25 | 6 | 5 | 5 | 4 | 197 | 48 |
| 26 | 6 | 6 | 5 | 5 | 37 | 68 |
| 27 | 6 | 6 | 10 | 5 | 54 | 63 |
| 28 | 6 | 6 | 20 | 5 | 61 | 61 |
| 29* | 7 | — | 0 | 5 | 6 | 74 |
| 30 | 7 | 4 | 5 | 5 | 213 | 57 |
| 31 | 7 | 6 | 10 | 5 | 43 | 68 |
| 32 | 7 | 6 | 20 | 5 | 58 | 59 |
| 33 | 7 | 7 | 20 | 5 | 35 | 66 |
| 34 | 7 | 8 | 5 | 5 | 39 | 72 |
| 35 | 7 | 8 | 10 | 4 | 118 | 61 |
| 36* | 8 | — | 0 | 5 | 9 | 74 |
| 37 | 8 | 4 | 3 | 5 | 173 | 66 |
| 38 | 8 | 4 | 5 | 4 | 329 | 59 |
| 39* | 9 | — | 0 | 5 | 2 | 79 |
| 40 | 9 | 4 | 1 | 5 | 9 | 63 |
| 41 | 9 | 4 | 5 | 5 | 61 | 55 |
| 42 | 9 | 4 | 10 | 3 | 202 | 55 |
| 43* | 10 | — | 0 | 5 | 18 | 79 |
| 44 | 10 | 1 | 0.5 | 5 | 52 | 55 |
| 45 | 10 | 1 | 1 | 5 | 88 | 53 |
| 46 | 10 | 2 | 0.5 | 5 | 44 | 55 |
| 47 | 10 | 2 | 1 | 5 | 80 | 66 |
| 48 | 10 | 2 | 5 | 4 | 406 | 61 |
| 49 | 10 | 4 | 1 | 5 | 65 | 66 |
| 50 | 10 | 4 | 5 | 3 | 715 | 55 |
| 51 | 10 | 4 | 10 | 3 | 1,651 | 55 |
| 52* | 11 | — | 0 | 5 | 15 | 66 |
| 53 | 11 | 1 | 0.5 | 5 | 35 | 57 |
| 54 | 11 | 1 | 1 | 5 | 46 | 57 |
| 55 | 11 | 2 | 0.5 | 5 | 27 | 68 |
| 56 | 11 | 2 | 1 | 5 | 41 | 59 |
| 57 | 11 | 4 | 1 | 3 | 56 | 61 |
| 58 | 11 | 4 | 5 | 2 | 408 | 48 |
| 59* | 12 | — | 0 | 5 | 24 | 92 |
| 60 | 12 | 4 | 5 | 5 | 1,241 | 68 |
| 61 | 12 | 4 | 10 | 4 | 1,715 | 77 |
| 62* | 13 | — | 0 | 5 | 15 | 92 |
| 63 | 13 | 4 | 5 | 5 | 763 | 66 |
| 64 | 13 | 4 | 10 | 4 | 1,239 | 81 |
| 65* | 14 | — | 0 | 5 | 3 | 81 |
| 66 | 14 | 4 | 5 | 5 | 25 | 72 |
| 67 | 14 | 4 | 10 | 5 | 25 | 70 |
| 68* | 15 | — | 0 | 5 | 4 | 85 |
| 69 | 15 | 4 | 5 | 5 | 83 | 72 |
| 70 | 15 | 4 | 10 | 5 | 125 | 70 |
| 71* | 16 | — | 0 | 5 | 6 | 92 |
| 72 | 16 | 4 | 5 | 5 | 165 | 74 |
| 73 | 16 | 4 | 10 | 5 | 298 | 68 |
| 74 | 17 | 4 | 5 | 5 | 58 | 81 |
| 75 | 17 | 4 | 10 | 5 | 101 | 68 |
| 76 | 18 | 4 | 5 | 5 | 123 | 85 |
| 77 | 18 | 4 | 10 | 5 | 160 | 70 |
| 78 | 19 | 4 | 5 | 5 | 237 | 88 |
| 79 | 19 | 4 | 10 | 5 | 328 | 68 |
| 80* | 20 | — | 0 | 5 | 4 | 57 |
| 81 | 20 | 4 | 5 | 4 | 35 | 57 |
| 82* | 21 | — | 0 | 5 | 10 | 66 |
| 83 | 21 | 4 | 5 | 4 | 143 | 61 |
| 84* | 22 | — | 0 | 5 | 2 | 88 |
| 85 | 2 | 4 | 5 | 4 | 198 | 59 |
| 86* | 23 | — | 0 | 5 | 10 | 79 |
| 87 | 23 | 4 | 5 | 3 | 1,848 | 33 |
| 88* | 24 | — | 0 | 5 | 10 | 77 |
| 89 | 24 | 4 | 5 | 4 | 35 | 94 |
| 90* | 25 | — | 0 | 5 | 2 | 66 |
| 91 | 25 | 4 | 5 | 5 | 124 | 112 |
| 92* | 26 | — | 0 | 5 | 2 | 79 |
| 93 | 26 | 4 | 5 | 5 | 7 | 85 |
| 94* | 27 | — | 0 | 5 | 4 | 80 |
| 95 | 27 | 4 | 5 | 5 | 81 | 81 |
| 96* | 28 | — | 0 | 5 | 27 | 87 |
| 97 | 28 | 4 | 5 | 4 | 456 | 66 |
| 98* | 29 | — | 0 | 5 | 56 | 82 |
| 99 | 29 | 4 | 5 | 3 | 189 | 65 |
| 100* | 30 | — | 0 | 5 | 29 | 85 |
| 101 | 30 | 4 | 5 | 4 | 155 | 70 |
| 102* | 31 | — | 0 | 5 | 4.4 | 39 |
| 103 | 31 | 4 | 0.5 | 5 | 7.4 | 42 |
| 104 | 31 | 4 | 1 | 5 | 11.5 | 38 |
| 105 | 31 | 4 | 1.5 | 5 | 20.8 | 40 |
| 106 | 31 | 4 | 6.0 | 4 | 109.9 | 12 |
| 107* | 32 | — | 0 | 5 | 0.3 | 66 |
| 108 | 32 | 4 | 1 | 5 | 0.7 | 63 |
| 109 | 32 | 4 | 5 | 5 | 5.1 | 29 |
| 110* | 33 | — | 0 | 5 | 0.2 | 59 |
| 111 | 33 | 4 | 1 | 5 | 0.6 | 59 |
| 112 | 33 | 4 | 10 | 5 | 7.8 | 30 |
| 113* | 34 | — | 0 | 5 | 0.3 | 51 |
| 114 | 34 | 4 | 1 | 5 | 0.6 | 39 |
| 115 | 34 | 4 | 5 | 5 | 3.5 | 28 |

*Control

EXAMPLES 116 AND 117

These examples demonstrate that a blend of poly(alkyloxazoline) with alkyl acrylate copolymers can be prepared prepolymerization. A mixture of either 18.2 g IOA, 0.8 g AA, and 1.0 g poly(ethyloxazoline) (Example 116) or 17.2 g IOA, 0.8 g AA and 2.0 g poly(ethyloxazoline) (Example 117) was dissolved in 30 g of an ethyl acetate solution containing 40 mg AIBN and 4.5 mg CBr$_4$, purged with nitrogen, and polymerized at 55° C. for 16 hrs. Adhesive performance was assessed as described above and shown in Table IV.

TABLE IV
Prepolymerization Blending of Poly(alkyloxazolines)

| Example | Oxazoline | Wt. % | Tack | Shear (Min.) | Peel (N/100 mm) |
|---|---|---|---|---|---|
| 116 | 4 | 5 | 5 | 151 | 81 |
| 117 | 4 | 10 | 5 | 141 | 72 |

EXAMPLES 118 AND 119

These examples demonstrate that the blends of this invention can be applied without the use of solvent as a hot melt PSA. The solvent was evaporated from the blends of Examples 37 and 38. The resulting bulk adhesive was extruded at 170° C. onto a 37 micrometer thick polyester backing to a thickness of 25 micrometers. After usual conditioning the adhesive properties shown in Table V were obtained.

TABLE V
Properties of Hot-Melt Coated Blends

| Example | Acrylate | Oxazoline | Wt. % | Tack | Shear (Min.) | Peel (N/100 mm) |
|---|---|---|---|---|---|---|
| 118 | 8 | 4 | 3 | 5 | 114 | 48 |
| 119 | 8 | 4 | 5 | 4 | 212 | 44 |

EXAMPLES 120 THROUGH 125

These examples demonstrate that the blends of this invention can be crosslinked to further improve cohesive strength, and that the improvement in properties for a given set of crosslinking conditions is better for the blend than for the starting alkyl acrylate copolymer. To an ethyl acetate solution of alkyl acrylate copolymer (95/5 IOA/AA, IV=1.25) was added 0.5% benzophenone. Half of this solution was blended with 5% poly(alkyloxazoline) #4. After coating onto 37 micrometer thick polyester film and drying, portions of the coated sheets were passed through a PPG Industries UV processor having two 300 watt medium pressure mercury lamps in series under an air atmosphere. Each adhesive formulation was given a dose of UV radiation corresponding to either 65 or 130 mJ/cm². After usual conditioning, the adhesive properties shown in Table VI were obtained.

TABLE VI

Crosslinked Adhesives

| Example | Acrylate | Oxazoline | Wt. % | UV Dose | Tack | Shear (Min.) | Peel (N/100 mm) |
|---|---|---|---|---|---|---|---|
| 120* | 7 | — | 0 | 0 | 5 | 5 | 63 |
| 121* | 7 | — | 0 | 65 | 5 | 113A | 55 |
| 122* | 7 | — | 0 | 130 | 5 | 72A | 50 |
| 123 | 7 | 4 | 5 | 0 | 5 | 204 | 48 |
| 124 | 7 | 4 | 5 | 65 | 5 | 3,451 | 44 |
| 125 | 7 | 4 | 5 | 130 | 5 | 543A | 37 |

A = Adhesive shear failure
*Control

EXAMPLES 126 THROUGH 128

These examples show preparation of blends using a high molecular weight (IV=1.6 dl/g) 95.5/4.5 IOA/AA acrylate copolymer in heptane/propanol solvent obtained from an aqueous emulsion polymerization following the procedure of Example 5, U.S. Pat. No. Re. 24,906.

| Example | Oxazoline | Wt. % | Tack | Shear (Min.) | Peel (N/100 mm) |
|---|---|---|---|---|---|
| 126* | — | 0 | 5 | 85 | 50 |
| 127 | 4 | 2 | 5 | 296 | 46 |
| 128 | 4 | 10 | 4 | 2,091 | 39 |

*Control

EXAMPLES 129 AND 130

These examples demonstrate preparation of the blends of this invention from an emulsion alkyl acrylate copolymer and an aqueous solution of the poly(alkyloxazoline) #4.

A butylacrylate-methacrylic acid copolymer emulsion PSA was obtained from Rohm and Haas under the trade designation Rhoplex PS-83D. A 20% aqueous solution of 50,000 MW poly(ethyloxazoline) #4 was added to this without apparent destablization of the latex. The aqueous blend was knife coated onto 37 micrometer thick polyester, conditioned, and the adhesive properties measured as shown in Table VII.

TABLE VII

| Example | Oxazoline | Wt. % | Tack | Shear (Min.) | Peel (N/100 mm) |
|---|---|---|---|---|---|
| 129* | — | 0 | 5 | 185 | 41 |
| 130 | 4 | 1 | 5 | 556 | 32 |

*Control

EXAMPLES 131 THROUGH 133

These examples demonstrate application of this invention to a tackified alkyl acrylate copolymer. To an ethyl acetate solution of alkyl acrylate copolymer #7 (95/5 IOA/AA, IV=1.25) was added 30 parts by weight of a glycerin rosin ester tackifier available from Hercules under the trade designation Foral 85. To portions of this formulation were added either 3 or 5 parts 50,000 MW poly(ethyloxazoline) #4 as an isopropanol solution. After coating, drying, and conditioning, adhesive properties shown in Table VIII were obtained.

TABLE VIII

| Example | Oxazoline | Wt. % | Tack | Shear (Min.) | Peel (N/100 mm) |
|---|---|---|---|---|---|
| 131* | — | 0 | 5 | 10 | 102 |
| 132 | 4 | 3 | 5 | 111 | 67 |
| 133 | 4 | 5 | 5 | 194 | 67 |

*Control

EXAMPLES 134 AND 135

These examples demonstrate application of this invention to a plasticized alkyl acrylate copolymer. To an ethyl acetate solution of alkyl acrylate copolymer #8 (94/6 IOA/AA, IV=1.24) was added 10 parts by weight of trioctyl trimellitate plasticizing oil available from Scientific Polymer Products. To a portion of this was added 5 parts 50,000 MW poly(ethyloxazoline) #4 as an isopropanol solution. After coating, drying, and conditioning, the adhesive properties shown in Table IX were obtained.

TABLE IX

| Example | Oxazoline | Wt. % | Tack | Shear (Min.) | Peel (N/100 mm) |
|---|---|---|---|---|---|
| 134* | — | 0 | 5 | 5 | 65 |
| 135 | 4 | 5 | 5 | 209 | 54 |

*Control

EXAMPLES 136 THROUGH 144

Acrylate copolymer #31 was reinforced with varying amounts of poly(alkyloxazoline) #4 and coated onto backing to make medical tapes. Adhesion to skin and residue were measured with the following results:

| Example | Wt. % | T-0 | T-48 | Residue |
|---|---|---|---|---|
| 136* | 0.0 | 146 | 261 | 1.6 |
| 137 | 0.1 | 99 | 154 | 0.7 |
| 138 | 0.2 | 107 | 162 | 0.8 |
| 139 | 0.3 | 93 | 198 | 0.7 |
| 140 | 0.5 | 64 | 243 | 0.4 |
| 141 | 1.0 | 50 | 223 | 0.4 |
| 142 | 1.5 | 43 | 173 | 0.4 |
| 143 | 3.0 | 32 | 214 | 0.8 |
| 144 | 6.0 | 29 | 161 | 0.4 |

*Control
T-0 Initial adhesion in Newtons per 100 millimeters of width
T-48 Adhesion after 48-hour residence time in Newtons per 100 millimeters of width While this invention has been described in terms of specific embodiments, it should be understood that it is capable of further modification. The claims herein are intended to cover those variations which one skilled in the art would recognize as the chemical equivalent of what has been described here.

I claim:
1. A normally tacky pressure-sensitive adhesive composition comprising a blend of the following:
   a. acrylic or methacrylic copolymer having an inherent viscosity greater than about 0.2 comprising copolymerized A and B monomers wherein:
   A is at least one free radically polymerizable vinyl monomer, at least one of which is an acrylic or methacrylic acid ester of a non-tertiary alcohol having from 1 to 18 carbon atoms with the average number of carbon atoms being about 4–12; and B is at least one polar monomer copolymerizable with A, the amount by weight of B monomer being up to about 30% of the total weight of all monomers in the copolymer;

b. up to about 150 parts by weight of compatible tackifying resin per 100 parts by weight copolymer;

c. up to about 50 parts by weight of compatible plasticizer per 100 parts by weight copolymer; and d. sufficient polyalkyloxazoline of a molecular weight above about 1,000 to provide the resultant blend with increased shear strength.

2. The pressure-sensitive adhesive composition of claim 1 wherein the amount of polyalkyloxazoline in said blend is sufficient to increase the shear strength of said blend by at least about 50% relative to the shear strength of the adhesive composition without polyalkyloxazoline.

3. The pressure-sensitive adhesive composition of claim 1 wherein the amount of polyalkyloxazoline in said blend is sufficient to increase the shear strength of said blend by at least about 100% relative to the shear strength of the adhesive composition without polyalkyloxazoline.

4. The pressure-sensitive adhesive composition of claim 1 wherein the average number of carbon atoms is about 4 to 10.

5. The pressure-sensitive adhesive composition of claim 1 wherein acrylic or methylacrylic acid ester is selected from the group consisting of butyl acrylate, isooctyl acrylate, isononyl acrylate, isodecyl acrylate, and 2-ethylhexyl acrylate.

6. The pressure-sensitive adhesive composition of claim 1 wherein said polar comonomer has hydroxyl or carboxylic, sulfonic, or phosphonic acid functionality.

7. The pressure-sensitive adhesive composition of claim 1 wherein said polar comonomer is selected from the group consisting of acrylic acid, 2-carboxyethyl acrylate, itaconic acid, 2-hydroxyethylacrylate, hydroxypropylacrylate, and 2-sulfoethylmethacrylate.

8. The pressure-sensitive adhesive composition of claim 1 wherein the amount by weight of said polar comonomer is from about 1% to about 15% of the total weight of all monomers in the copolymer.

9. The pressure-sensitive adhesive composition of claim 1 wherein the inherent viscosity is in the range of about 0.4 to about 2.5.

10. The pressure-sensitive adhesive composition of claim 1 wherein the acrylic or methacrylic copolymer contains as one of the A monomers a hydrophilic macromolecular monomer.

11. The pressure-sensitive adhesive composition of claim 1 wherein said polyalkyloxazoline has a repeating unit having the following formula:

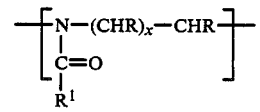

wherein R is hydrogen or an inertly-substituted lower alkyl group, x is 1 or 2, and $R^1$ is selected from the group consisting of hydrogen, phenyl, inertly-substituted phenyl, alkyl having up to about 20 carbon atoms, or inertly-substituted alkyl.

12. The pressure-sensitive adhesive composition of claim 11 wherein x is 1, R is hydrogen, and $R^1$ is selected from hydrogen and alkyl groups containing up to about 10 carbon atoms.

13. The pressure-sensitive adhesive composition of claim 11 wherein x is 1, R is hydrogen, and $R^1$ is selected from hydrogen, methyl, ethyl and propyl.

14. The pressure-sensitive adhesive composition of claim 1 wherein the amount of polyalkyloxazoline is in the range of about 0.2 parts to about 25 parts by weight polyalkyloxazoline per 100 parts by weight of the combined weight of said copolymer and said polyalkyloxazoline.

15. The pressure-sensitive adhesive composition of claim 1 wherein the amount of polyalkyloxazoline is in the range of about 0.5 parts to about 10 parts by weight polyalkyloxazoline per 100 parts by weight of the combined weight of said copolymer and said polyalkyloxazoline.

16. The pressure-sensitive adhesive composition of claim 1 wherein said polyalkyloxazoline has a molecular weight within the range of about 1,000 to about 2,000,000.

17. The pressure-sensitive adhesive composition of claim 1 wherein said polyalkyloxazoline has a molecular weight within the range of about 2,000 to about 500,000.

18. A sheet material having at least a portion of at least one major surface coated with the pressure-sensitive adhesive composition of claim 1.

19. An adhesive coated tape comprising a flexible backing having at least one major surface coated with the pressure-sensitive adhesive composition of claim 1.

20. The transfer tape comprising a film of the pressure-sensitive adhesive composition of claim 1 borne on at least one release liner.

21. The pressure-sensitive adhesive composition of claim 1 further characterized by being crosslinked.

* * * * *

UNITED STATES PATENT AND TRADEMARK OFFICE
CERTIFICATE OF CORRECTION

PATENT NO. : 4,737,410

DATED : April 12, 1988

INVENTOR(S) : Kantner

It is certified that error appears in the above-identified patent and that said Letters Patent is hereby corrected as shown below:

Column 4, line 39, delete "s" and insert in its place --B--.

Column 7, line 14, delete "typicaIIy" and insert in its place --typically--.

Signed and Sealed this

Twenty-fifth Day of July, 1989

Attest:

DONALD J. QUIGG

Attesting Officer

Commissioner of Patents and Trademarks